(12) United States Patent
Datema et al.

(10) Patent No.: US 8,646,965 B2
(45) Date of Patent: Feb. 11, 2014

(54) CONCRETE MIXING DRUM FIN STRUCTURE

(75) Inventors: Bryan S. Datema, Rochester, MN (US); Thomas G. Lindblom, Claremont, MN (US); Thomas J. Harris, Rochester, MN (US); Clint D. Glunz, Rochester, MN (US); William P. Bartlett, Sr., Dodge Center, MN (US)

(73) Assignee: McNeilus Truck and Manufacturing, Inc., Dodge Center, MN (US)

( * ) Notice: Subject to any disclaimer, the term of this patent is extended or adjusted under 35 U.S.C. 154(b) by 0 days.

(21) Appl. No.: 13/282,697

(22) Filed: Oct. 27, 2011

(65) Prior Publication Data

US 2013/0107656 A1    May 2, 2013

(51) Int. Cl.
*B28C 5/18* (2006.01)
*B01F 9/00* (2006.01)

(52) U.S. Cl.
USPC ............................................. 366/59; 366/227

(58) Field of Classification Search
USPC ............... 366/53, 54, 59, 213, 220, 225, 226, 366/227, 228, 229
See application file for complete search history.

(56) References Cited

U.S. PATENT DOCUMENTS 5,056,924 A * 10/1991 Christenson .................... 366/59
5,178,457 A    1/1993 Helmy
5,378,061 A    1/1995 Christenson
5,427,449 A *  6/1995 Christenson et al. ........... 366/59
6,007,233 A * 12/1999 Cairns ............................. 366/42
6,149,291 A   11/2000 Christenson
6,902,311 B1 * 6/2005 Khouri et al. ................... 366/54
2008/0259716 A1 10/2008 Khouri

FOREIGN PATENT DOCUMENTS

EP    1950017 A1    7/2008

OTHER PUBLICATIONS

International Search Report and Written Opinion dated Mar. 8, 2013.

* cited by examiner

*Primary Examiner* — Tony G Soohoo
*Assistant Examiner* — Anshu Bhatia
(74) *Attorney, Agent, or Firm* — Foley & Lardner LLP

(57) ABSTRACT

A mixing fin assembly adapted to mix and guide materials in a rotatable mixing drum of a type used in a transit concrete mixing vehicle includes a spiral mixing fin designed to extend transversely into the drum constructed of a lightweight, moldable polymeric material which is flexible and resistant to abrasion, the mixing fin includes a plurality of conjoined sections that are fit together, preferably utilizing fin locking tabs and mating fin locking sockets. A preferred way of mounting the mixing fin into mixing drums uses a spiral fin mount rail track adapted to be fixed to the interior surface of the mixing drum. A locking tab locks the upper part of the rail track into the fin structure.

20 Claims, 5 Drawing Sheets

CONCRETE MIXING DRUM FIN STRUCTURE

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to mobile systems carrying rotatable mixing drums for mixing and dispensing concrete. More specifically, this invention relates to a helical mixing fin assembly for mixing and moving materials within concrete mixing drums that involves a superior fin structure and system for mounting the helical mixing fin assembly within rotatable drum mixers.

II. Related Art

Concrete mixing trucks are widely used in the construction industry for preparing and transporting concrete mix to desired construction sites. Such trucks feature a large rotatable mixing drum which includes fins or agitators mounted inside for mixing and directing the movement of a concrete mixture therein. Such fins typically have a helical configuration which will tend to mix concrete when the mixing drum is rotated in a first direction and urge the concrete towards a discharge chute when the mixing drum is turned in an opposite direction.

The mixing or agitation of materials such as concrete in a rotary mixing environment creates a great deal of abrasive friction between the mixing fins and the various abrasive components of the concrete mixture which is being transported. As a result, mixing fins have typically worn out long before the outer wall of the mixing drum itself and so the drums have had to be rebuilt or replaced sooner than desired. Accordingly, polymer-coated metal fins and mixing fins constructed of polymeric materials, particularly with internal reinforcing materials, have been developed. Mixing fin structures of the class have been shown, for example, in U.S. Pat. Nos. 5,056,924; 5,178,457; 5,378,061; and 5,427,449. While a degree of success has been achieved with such mixing fins, there remains a need for a helical or spiral mixing fin assembly that includes an improved mounting structure for use in concrete mixing drums of various materials.

SUMMARY OF THE INVENTION

By means of the present invention, there is provided a mixing fin assembly adapted to mix and guide materials contained in a rotatable mixing drum of a type used in a transit concrete vehicle mixing system. The mixing fin assembly includes a spiral mixing fin designed to extend transversely into a drum mixing space. The fin is constructed of a lightweight, moldable polymeric material which is flexible and resistant to abrasion. The spiral mixing fin includes a plurality of conjoined sections that are fit together, preferably utilizing fin locking tabs and mating fin locking sockets at the ends of the sections which can be used to lock the plurality of sections together, preferably using an amount of adhesive.

The assembly includes a mounting system. A preferred way of mounting the mixing fin into a metal mixing drum involves the use of a spiral fin mount rail track adapted to be fixed to the interior surface of the mixing drum as by welding and which fits into a track locking socket or slot recess in the fin structure which accommodates the fin mount rail track. The rail track also preferably includes an enlarged top or locking tab which is accommodated on the fin and which locks the upper part of the rail track into the fin structure. The spiral mixing fin preferably has aligned weep openings when assembled, which enable free flow of material along the inside surface of the mixing drum. Mixing holes may also be provided on the fin structure.

The mixing fin assembly also may include an amount of adhesive and/or composite material applied to the bottom of the fin sections to secure the mixing fin to the interior surface of the mixing drum. Alternatively, the mixing fin assembly may be fixed to the mixing drum using bolts welded to the drum.

The mixing fin assembly of the present invention is further adapted to be used in conjunction with drums made of polymeric material themselves in which the fin can be applied by adhesive or made as an integral part of the mixing drum structure.

DETAILED DESCRIPTION

The following description details one or more exemplary embodiments illustrating the present invention. It should be noted that the detailed descriptions are intended by way of example only and are not intended to limit the scope of the invention in any respect. It will be further understood that the embodiments of the invention can be modified by those skilled in the art while remaining in keeping with the inventive concepts.

Figure 1:
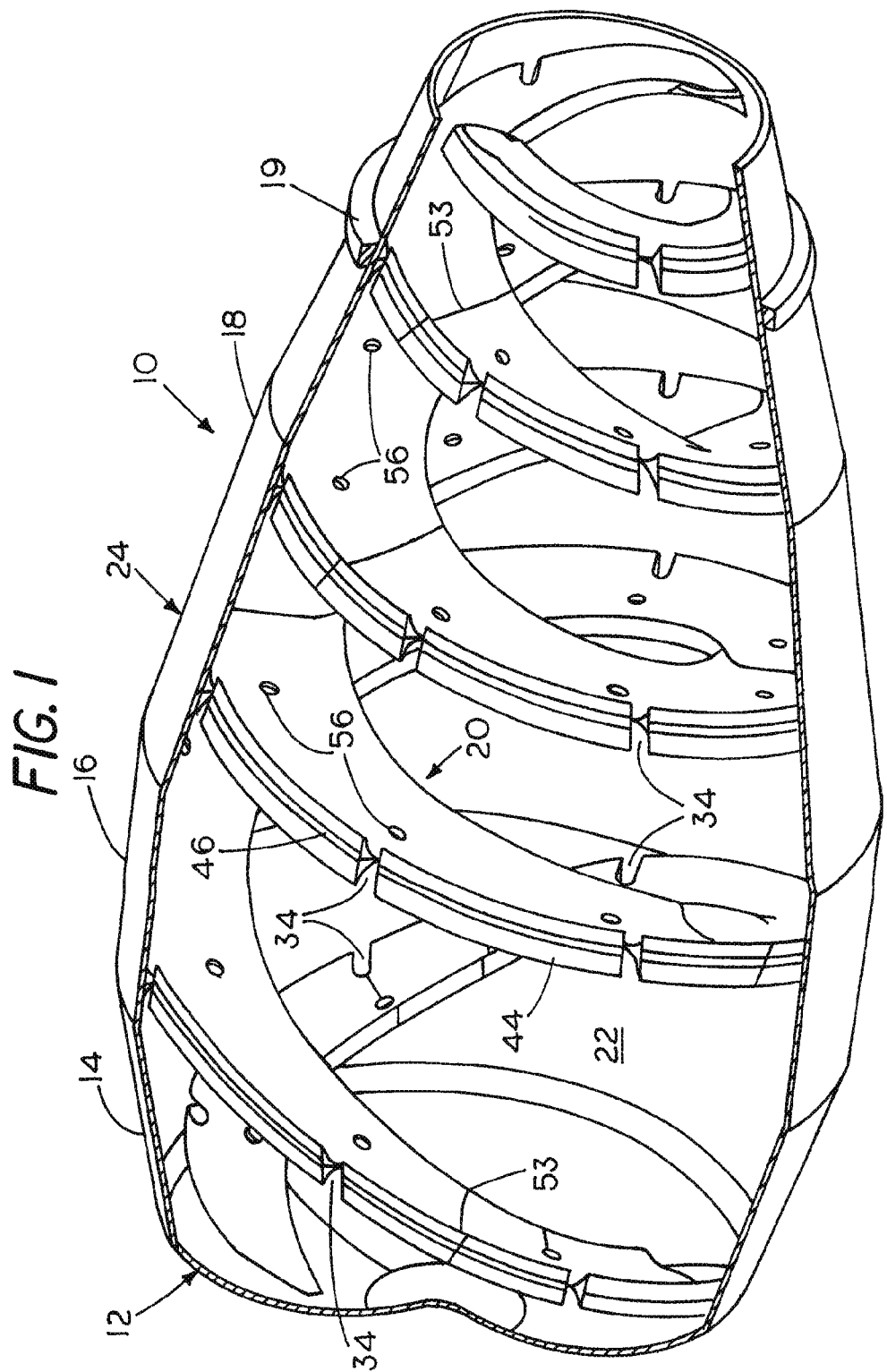
FIG. 1 is a perspective view of a mixing drum with the shell partially cut away to expose an internal helical mixing fin assembly in accordance with the invention.
Figure 2:
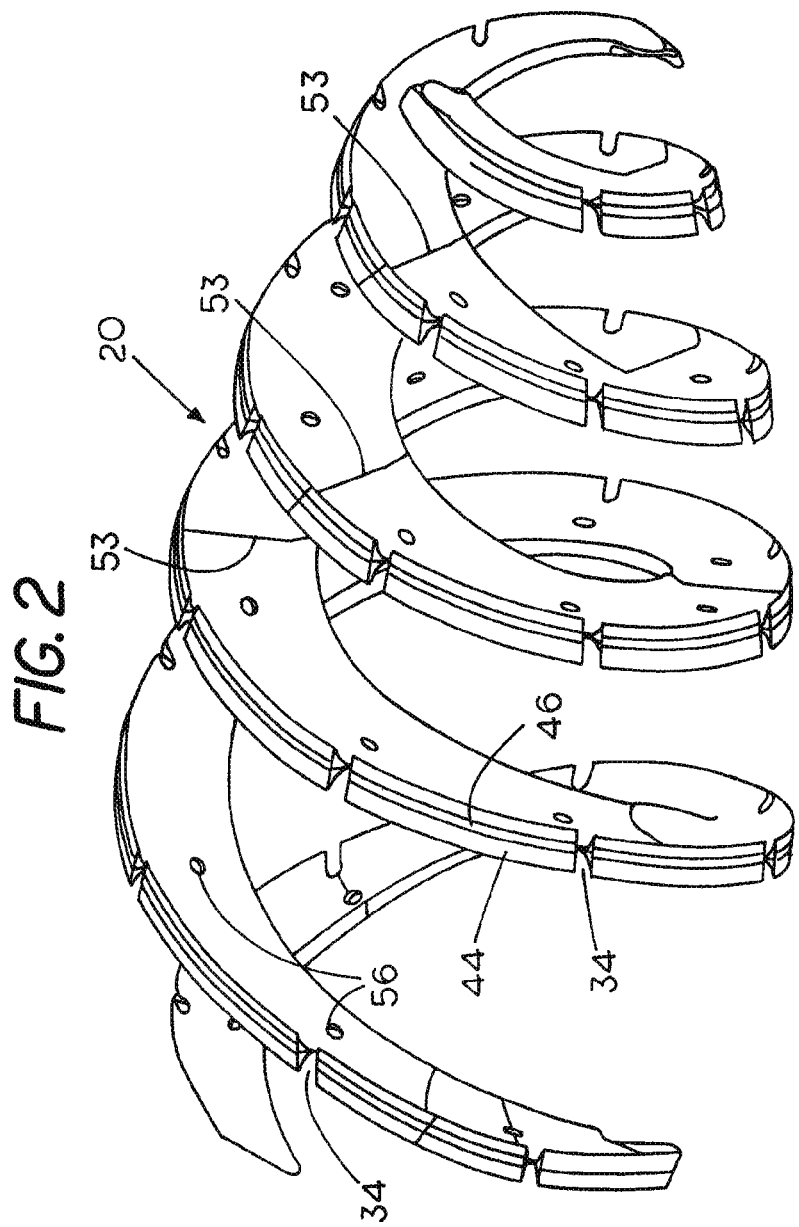
FIG. 2 is a perspective view of the helical fin assembly of FIG. 1 showing assembled fin sections without the drum shell.
Figure 3:
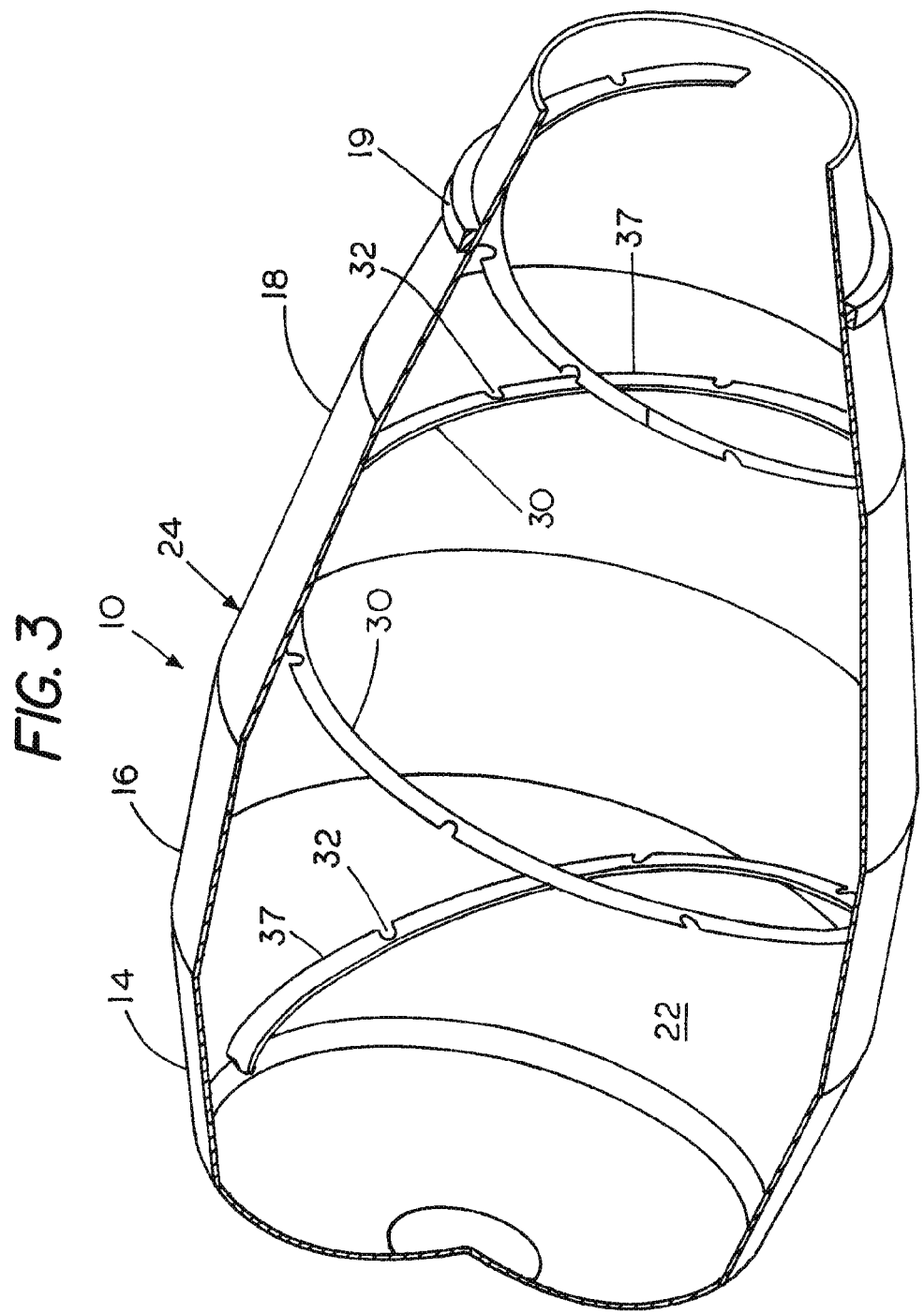
FIG. 3 is a view of a mixing drum with the side partially cut away similar to that of FIG. 1 showing a fin mount rail track system which can be used to mount fin sections into the drum.
Figure 4:
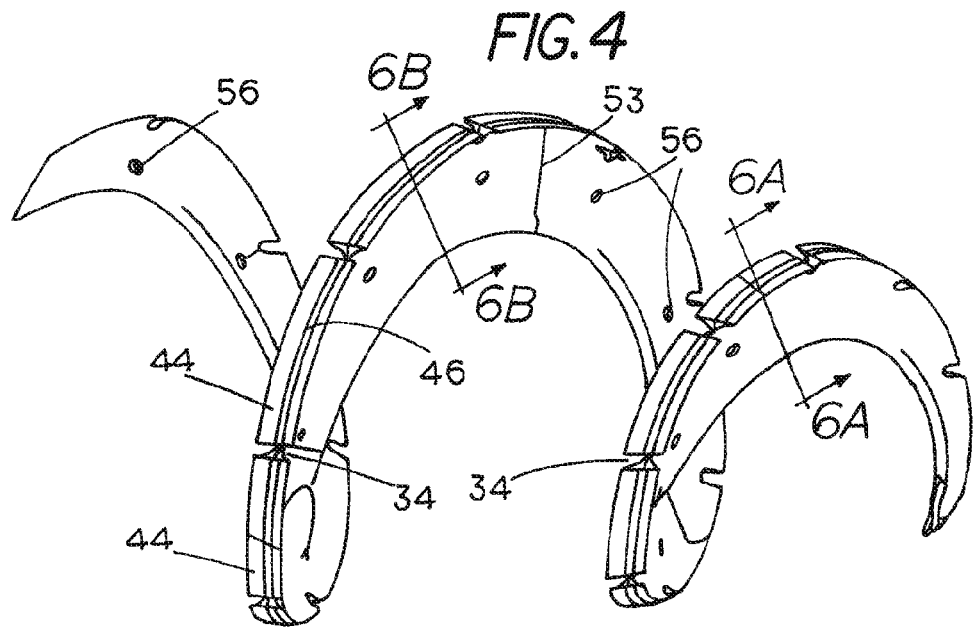
FIG. 4 is a view of a segment of a helical mixing fin assembly showing section lines for FIGS. 6A and 6B.

In FIG. 1, there is shown a concrete mixing drum generally at 10 of a type designed to be carried by a transit concrete mixing truck. Such drums are conventionally mounted for rotation on a front support frame and a rear support frame in a well-known manner. Mixing drums can be formed in varying sizes, usually holding 3-20 cubic yards. As seen in FIGS. 1 and 3, the mixing drum 10 includes a head cone portion 12, a belly or crossover portion 14, a big cone portion 16 and a rear tail cone portion 18. A support collar is shown at 19.

A helical or spiral mixing fin or flight shown assembled at 20 is made up of a plurality of adjoining sections that may be of varying lengths and heights assembled together to form a complete helix or spiral which is mounted to the inside surface 22 of the drum shell 24.

Figure 6A:
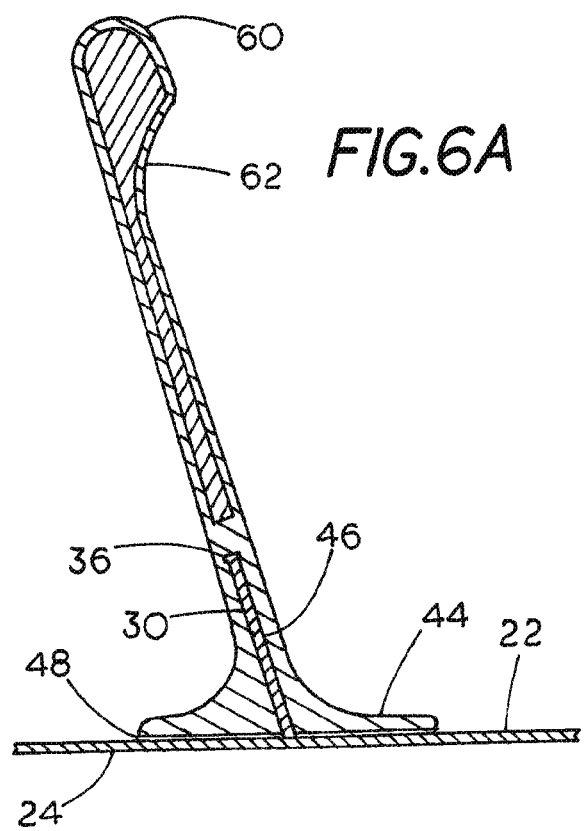
FIGS. 6A and 6B are greatly enlarged cross-sectional views of a fin structure in accordance with the section lines in FIG. 4.

The helical or spiral mixing fin serves several functions. The main purpose of the mixing fin, of course, is to agitate and mix materials contained within the drum as the drum is rotated. In addition, however, the fin is configured to move the materials being mixed toward the front or head cone of the drum during mixing with the drum rotating in a first direction and to move the contents of the drum toward the tail or discharge end when the rotation is in a second direction where mixed concrete can be dispensed. The orientation of the fin is generally at a slight angle from orthogonal with respect to the inside wall 22 of the drum or shown in FIGS. 6A and 6B.

In FIG. 3, there is depicted a fin mount rail track 30 which represents one technique for fastening the helical mixing fin assembly 20 into the mixing drum 10. The rail track includes spaced drainage openings or weep holes as at 32 which are designed to match spaced openings or weep holes 34 in the fin structure when the system is assembled. The top of the rail track includes a locking tab 36 (FIGS. 6A and 6B) which aids in locking mounted fin sections to the rail track. The fin mount rail track is preferably welded to the inside surface 22 of the drum shell 24 as at 37, but a bolting assembly (not shown) can be provided.

Figure 5A:
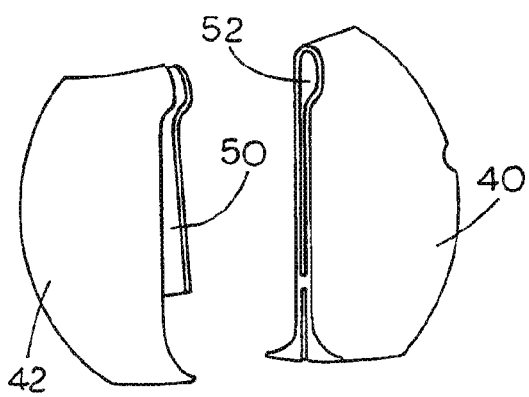
FIGS. 5A and 5B are enlarged fragmentary views depicting one assembly technique for a helical or spiral mixing fin in accordance with the invention.
Figure 5B:
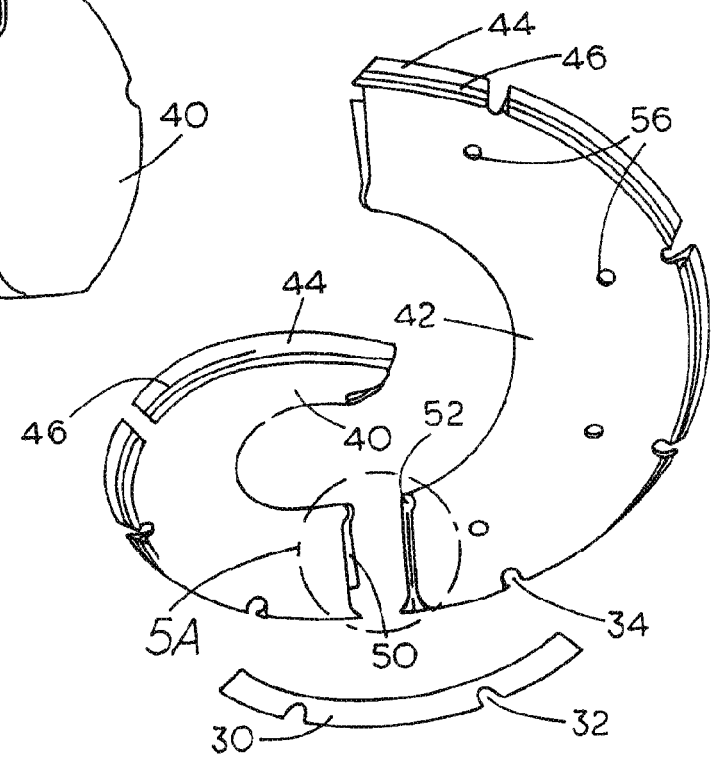

As shown in the figures, the helical or spiral mixing fin structure is made up of a plurality of conjoined sections as at 40 and 42 (FIGS. 5A and 5B). The embodiment shown includes a rather wide base 44 for stability and better mounting adhesion, and a continuous groove or track locking socket 46 for receiving the fin mount rail track 30 with locking tab 36. A layer of adhesive 48 is applied to the bottom of the fin sections 44 to secure the fin sections to the inside surface 22 of the drum wall 24, as shown best in FIGS. 6A and 6B. Adhesive and/or composite material may also be applied to the fin mount rail track prior to locking the fin sections to the rail track. If the drum shell is of steel, the rail track is normally welded to the drum shell.

Figure 6B:
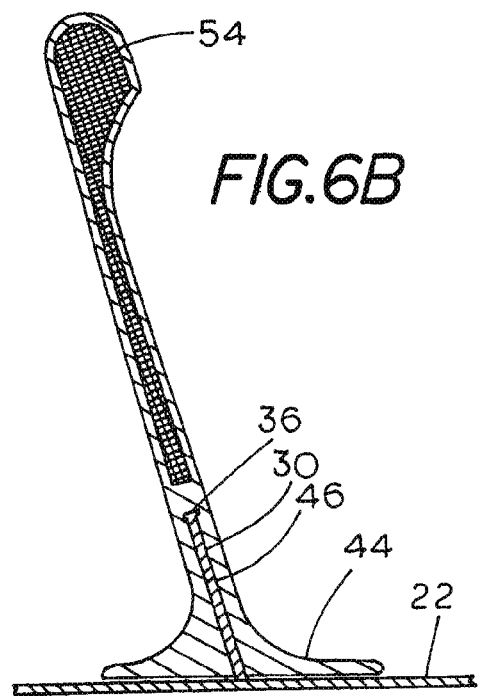

As shown best in FIGS. 5A and 5B, the fin sections themselves are locked together in a snap-fit-type arrangement using fin locking tabs as at 50 and mating locking sockets 52. Seams are shown at 53. Adhesive may be applied to the snap-fitting elements prior to locking the fin sections together. As shown in FIG. 6B, the fin structure may include a series of spaced thin indicator disks 54, overmolded in the fin structure, which are used to indicate maximum fin wear when exposed to show that replacement is required.

The fin sections also include mixing holes as at 56 to aid in the blending of materials as they are mixed. The weep holes 34 in the fin structure are aligned with the openings 32 in the fin mount rail track to provide continuous drainage through the fin structure. As shown particularly in FIGS. 6A and 6B, the fin structure is disposed to list somewhat toward the head cone portion of the drum rather than being orthogonally mounted relative to the drum surface. The fin has an enlarged upper portion 60 and a curved surface 62. The fin profile shown in FIGS. 6A and 6B has proven to provide excellent mixing and agitation and the wide base 94 provides good stability.

The fin sections are preferably molded from a "polymeric material" and may contain a plurality of such materials. As used herein, the term "polymeric material" is meant to be construed in a broad sense so as to include any composition suitable for such a mixing fin. Thus, this would include any such highly abrasion resistant, suitably flexible, non-metallic relatively light weight material that has a low coefficient of friction and which wears well and can be mold-processed readily.

Preferably, the fin sections are fabricated from a thermoset polymeric material which is relatively lightweight, resilient and which will tend to remain smooth after wear. The most preferred polymeric composition is a polyurethane-based polymer blended with a filler material. The filler material is preferably a polyethylene material such as PRIMAX™ UH-1000 Series Particles (Air Products and Chemicals, Inc.) which is based on ultrahigh molecular weight polyethylene resin. The filler material provides for increased wear resistance, increased tear resistance, a lower coefficient of friction, and increased stiffness and hardness (Shore D) of the polymeric composition. The polymeric material used in making the fin sections preferably comprises a polyurethane and polyethylene blend which has about 70 to 95 wt-%, preferably about 80 to 90 wt-% of polyurethane and about 30 to 5 wt-%, preferably about 20 to 10 wt-% of polyethylene. It is to be understood that the polyurethane component can contain a curing agent and minor amounts of other components such as chain extenders, catalysts, pigments, etc.

The polymeric material used to form the plastic fin sections can also have other filler materials such as various reinforcing fibers. Non-limiting examples of such fibers include glass fibers, carbon fibers, metallic fibers, polymeric fibers such as aramid fibers, coated fibers, etc. It is important that the outer surfaces of the fin sections be smooth, so as to facilitate efficient removal of concrete from the fins after use.

The various fin sections of fin assembly 20 can be made in a typical molding operation such as, for example, by cast molding or reaction-injection molding (RIM). In that molding operation, the fin sections are formed by rapid injection of two metered liquid streams, one stream containing a polyurethane prepolymer (polyol and isocyanate) blended with the filler material such as polyethylene, and the other stream containing a typical curing agent. These two streams are mixed and poured into the mold to form the mixing fin. Alternatively, a third stream containing the filler material can be used to mix the filler material with two other streams containing the prepolymer and curing agent before they enter a mold. The curing agent is employed to provide cross-linking of the polymers. Once the molding has occurred, the fin section is placed in an oven to cure the polymeric material which causes final cross-linking to take place. Of course, other processes may be employed depending on the composition and internal structure of the fins.

In operation, the flexible plastic mixing fin according to the invention has a smooth, slippery surface which prevents concrete from adhering to the fin and forming hardened buildup deposits. The polymeric material should have good wearability and strength characteristics relative to its weight. A further advantage to the plastic mixing fins according to the invention is that they can be easily molded to any shape and thickness. This allows them to be molded thicker at points where greater strength and stiffness are needed.

While the above description details the use of a fin mount rail track 30 fixed to a metallic drum surface 22 to secure the mixing assembly structure in place, it will be appreciated that the fin structure of the invention can be secured in place by adhesive bonding, bolting and other techniques as well. The mixing fin assembly of the present invention can also be installed in mixing drums made of composite polymeric materials themselves, which may contain fiberglass, or the like, using any of the described techniques, but may preferably be integrally bonded to the shell.

Lighter weight mixing drums capable of processing larger concrete loads using lightweight gas-hardened or otherwise lightweight hardened abrasion resistant steel shells can be used in combination with the mixing fins of the present invention. Gas hardening enables steel shells as thin as 1-3 mm to outlast heavier models having much thicker shells.

This invention has been described herein in considerable detail in order to comply with the patent statutes and to provide those skilled in the art with the information needed to apply the novel principles and to construct and use embodiments of the example as required.

However, it is to be understood that the invention can be carried out by specifically different devices and that various modifications can be accomplished without departing from the scope of the invention itself.

What is claimed is:

1. A mixing fin assembly adapted to mix and guide materials contained in a rotatable mixing drum of a type used in a transit concrete vehicle mixing system, the assembly comprising:
   (a) a spiral mixing fin including a track locking socket, said fin being designed to extend transversely into a drum mixing space and constructed of a lightweight moldable polymeric material which is flexible and resistant to abrasion; and
   (b) a spiral fin mount rail track including a top rim locking tab, wherein the spiral fin mount rail track is adapted to be fixed to the interior surface of the mixing drum and to aid in anchoring and stabilizing said spiral fin assembly in said drum;
   (c) wherein said spiral mixing fin comprises a plurality of conjoined sections fit together and which are configured to attach to said fin mount rail track;
   (d) wherein the track locking socket of the spiral mixing fin is shaped to accommodate the top rim locking tab thereby interlocking the spiral mixing fin with the spiral fin mount rail track.

2. A mixing fin assembly as in claim 1 wherein said mixing fin includes a plurality of wear indicator disks overmolded in said fin structure.

3. A mixing fin assembly as in claim 1 wherein said fin mount rail track and said spiral mixing fin have aligned weep openings when assembled.

4. A mixing fin assembly as in claim 1 wherein said fin sections include fin locking tabs and mating fin locking sockets at the ends thereof to lock said plurality of sections together after said fin sections are attached to said track in an end-to-end snap-fit arrangement.

5. A mixing fin assembly as in claim 1 including an amount of adhesive applied to the bottom of the fin sections to secure said mixing fin to an interior surface of a mixing drum.

6. A mixing fin assembly as in claim 1 wherein said spiral fin is adapted to be bolted to a mixing drum.

7. A mixing fin assembly as in claim 1 contained in a mixing drum.

8. A mixing fin assembly adapted to mix and guide materials contained in a rotatable mixing drum of a type used in a transit concrete vehicle mixing system, the assembly comprising:
   (a) a spiral mixing fin designed to extend transversely into a drum mixing space and constructed of a lightweight moldable polymeric material which is flexible and resistant to abrasion, wherein the spiral mixing fin includes:
      a first fin section having an end that defines a fin locking tab; and
      a second fin section having an end that defines a mating locking socket shaped to receive the fin locking tab,
      wherein the fin locking tab and the mating locking socket extend along a helical axis of the first fin section and the second fin section;
   (b) wherein said spiral mixing fin is adapted to be attached to an interior surface of a composite polymeric mixing drum by inclusion as an integral part of a composite drum shell.

9. A mixing fin assembly as in claim 8 contained in a composite polymeric mixing drum.

10. A mixing fin assembly as in claim 1 wherein the spiral mixing fin defines a plurality of spaced mixing openings to aid in the blending of materials.

11. A mixing fin assembly as in claim 8 wherein the first fin section includes a planar end surface, the fin locking tab extending from the planar end surface.

12. A mixing fin assembly as in claim 11 wherein the second fin section includes a planar end surface, the mating locking socket defined in the planar end surface.

13. A mixing fin assembly as in claim 12 wherein the fin locking tab and the mating locking socket have a cross sectional shape that corresponds with the first fin section and the section fin section.

14. A mixing fin assembly, comprising:
   (a) a spiral mixing fin designed to extend into a drum mixing space and constructed of a lightweight moldable polymeric material which is flexible and resistant to abrasion, wherein the spiral mixing fin includes:
      a first fin section including a track locking socket and having an end that defines a fin locking tab; and
      a second fin section including a track locking socket and having an end that defines a mating locking socket shaped to receive the fin locking tab,
      wherein the fin locking tab and the mating locking socket extend along a helical axis of the first fin section and the second fin section; and
   (b) a spiral fin mount rail track including a top rim locking tab, wherein the spiral fin mount rail track is adapted to be fixed to an interior surface of a mixing drum and anchor the spiral mixing fin;
   (c) wherein the track locking sockets of the first fin section and the second fin section are shaped to accommodate the top rim locking tab thereby interlocking the spiral mixing fin with the spiral fin mount rail track.

15. The mixing fin assembly of claim 14, wherein the first fin section includes a planar end surface, the fin locking tab extending from the planar end surface.

16. The mixing fin assembly of claim 15, wherein the second fin section includes a planar end surface, the mating locking socket defined in the planar end surface.

17. The mixing fin assembly of claim 16, wherein the fin locking tab and the mating locking socket have a cross sectional shape that corresponds with the first fin section and the section fin section.

18. The mixing fin assembly of claim 14, wherein said mixing fin includes a plurality of wear indicator disks overmolded in said fin structure.

19. The mixing fin assembly of claim 14, further comprising an amount of adhesive applied to the bottom of the fin sections to secure said mixing fin to an interior surface of a mixing drum.

20. A mixing drum including the mixing fin assembly of claim 14.

* * * * *